(12) United States Patent
Manjunath et al.

(10) Patent No.: US 12,416,941 B2
(45) Date of Patent: Sep. 16, 2025

(54) READ SYNCHRONIZATION DELAY AT SUBORDINATE DEVICE FOR 1 WIRE PROTOCOL

(71) Applicant: QUALCOMM Incorporated, San Diego, CA (US)

(72) Inventors: Nakul Manjunath, Bangalore (IN); Subramanya N N, Mysore (IN); Utpal Barman, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 108 days.

(21) Appl. No.: 18/442,751

(22) Filed: Feb. 15, 2024

(65) Prior Publication Data

US 2025/0264908 A1    Aug. 21, 2025

(51) Int. Cl.
*G06F 1/12*    (2006.01)
(52) U.S. Cl.
CPC ..................... *G06F 1/12* (2013.01)
(58) Field of Classification Search
CPC ................. G06F 1/32; G06F 9/44; G06F 1/12
See application file for complete search history.

(56) References Cited

U.S. PATENT DOCUMENTS

| | | | |
|---|---|---|---|
| 10,635,630 B2 | 4/2020 | Mishra et al. | |
| 10,698,849 B2 | 6/2020 | Murphy | |
| 2008/0059667 A1 | 3/2008 | Berenbaum et al. | |
| 2011/0292842 A1* | 12/2011 | Danet | G06F 13/385 370/276 |
| 2015/0067202 A1* | 3/2015 | Wastlhuber | G05B 19/0426 710/61 |
| 2017/0220503 A1 | 8/2017 | Southcombe et al. | |
| 2019/0302830 A1 | 10/2019 | Chen et al. | |
| 2021/0216494 A1 | 7/2021 | Ballantyne | |
| 2023/0267085 A1 | 8/2023 | Mishra et al. | |

OTHER PUBLICATIONS

Emerson: "Interconnect Considerations for MIPI® RFFE", Updated Mar. 22, 2023, 17 Pages.
Wilkerson V., "Unification in the RF front-End: The New MIPI Standard", EE Times, Designlines, RF and Microwave Designline, Aug. 11, 2010, 8 Pages.

* cited by examiner

*Primary Examiner* — Keshab R Pandey
(74) *Attorney, Agent, or Firm* — Moore IP

(57) ABSTRACT

A subordinate device includes a local clock and a protocol controller. The protocol controller is coupled to a bus that includes a data wire. The protocol controller is configured to receive, on the data wire from a principal device, a read command addressed to the subordinate device indicating initiation of a read transaction. The protocol controller is also configured to, after a delay window, send synchronization pulses to the principal device based on the local clock, where a duration of the delay window is greater than a clock cycle of the local clock. The protocol controller is further configured to, after sending the synchronization pulses, send data on the data wire to the principal device based on the local clock during the read transaction.

20 Claims, 6 Drawing Sheets

READ SYNCHRONIZATION DELAY AT SUBORDINATE DEVICE FOR 1 WIRE PROTOCOL

I. FIELD

The present disclosure is generally related to read synchronization delay at subordinate device for 1 wire protocol.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often include components, such as processing circuits, antennas, filters, storage devices, peripheral devices, etc., that communicate via a serial bus. The MIPI® (a registered trademark of MIPI Alliance, Inc.) alliance has defined a Radio Frequency Front End (RFFE) interface for communication among radio frequency (RF) front-end devices. For example, the RFFE interface enables communication between a principal device and one or more subordinate devices (e.g., RFFE components) over a serial bus. The principal device may also be referred to as a "master" device and a subordinate device may also be referred to as a "slave" device.

According to the RFFE interface, in a two-wire protocol, a read command from the principal device over the serial bus to a subordinate device is followed by a bus park after which the subordinate device is expected to provide the requested data on the serial bus. Typically, the bus park has a one clock cycle duration that can be insufficient for the requested data to be available to send at the subordinate device. The data retrieved by the principal device from the serial bus subsequent to the bus park can thus be invalid.

Similarly, in a one-wire protocol, a read command from the principal device over the serial bus to a subordinate device is followed by a bus park after which the subordinate device is expected to send synchronization pulses and then provide the requested data on the serial bus. Typically, the bus park has a one clock cycle duration that can be insufficient for the requested data to be available to send at the subordinate device. The data retrieved by the principal device from the serial bus subsequent to the synchronization pulses can thus be invalid.

III. SUMMARY

According to one implementation of the present disclosure, a subordinate device includes a local clock and a protocol controller. The protocol controller is coupled to a bus that includes a data wire. The protocol controller is configured to receive, on the data wire from a principal device, a read command addressed to the subordinate device indicating initiation of a read transaction. The protocol controller is also configured to, after a delay window, send synchronization pulses to the principal device based on the local clock, where a duration of the delay window is greater than a clock cycle of the local clock. The protocol controller is further configured to, after sending the synchronization pulses, send data on the data wire to the principal device based on the local clock during the read transaction.

According to another implementation of the present disclosure, a method includes receiving, at a subordinate device on a data wire of a bus from a principal device, a read command addressed to the subordinate device indicating initiation of a read transaction. The method also includes, after a delay window, sending synchronization pulses from the subordinate device to the principal device based on a local clock of the subordinate device, where a duration of the delay window is greater than a clock cycle of the local clock. The method further includes, after sending the synchronization pulses, sending data from the subordinate device on the data wire to the principal device based on the local clock during the read transaction.

According to another implementation of the present disclosure, a non-transitory computer-readable medium stores instructions that, when executed by one or more processors, cause the one or more processors to receive, at a subordinate device on a data wire of a bus from a principal device, a read command addressed to the subordinate device indicating initiation of a read transaction. The instructions also cause the one or more processors to, after a delay window, send synchronization pulses from the subordinate device to the principal device based on a local clock of the subordinate device, where a duration of the delay window is greater than a clock cycle of the local clock. The instructions further cause the one or more processors to, after sending the synchronization pulses, send data from the subordinate device on the data wire to the principal device based on the local clock during the read transaction.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
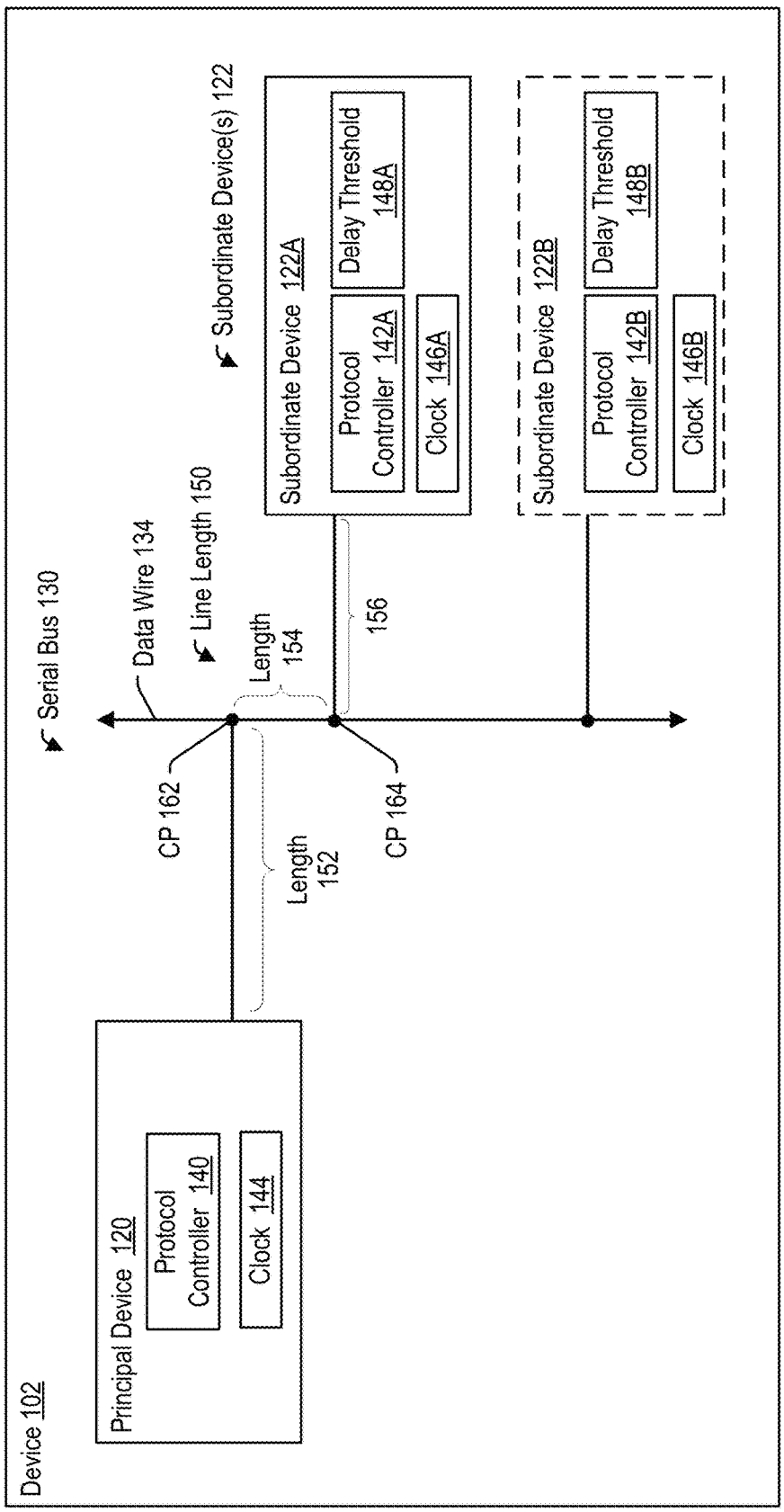
FIG. 1 is a block diagram of a particular illustrative aspect of a system operable to configure a read synchronization delay at a subordinate device for 1 wire protocol, in accordance with some examples of the present disclosure.

In a one-wire protocol, a read command from a principal device over a serial bus to a subordinate device is followed by a bus park after which the subordinate device is expected to send synchronization pulses and then provide the requested data on the serial bus. Typically, the bus park has a one clock cycle duration that can be insufficient for the requested data to be available to send at the subordinate device. The data retrieved by the principal device from the serial bus subsequent to the synchronization pulses can thus be invalid.

To retrieve valid data from the serial bus, the principal device can send multiple identical read requests. For example, the principal device can send a first read request on the serial bus, ignore data on the serial bus after receiving synchronization pulses after a one clock cycle bus park subsequent to the first read request, send a second read request on the serial bus, and read data on the serial bus after receiving synchronization pulses after a one clock cycle bus park subsequent to the second read request. When the one clock cycle bus park subsequent to the second read request is complete, the subordinate device is more likely to have the requested data available to send and the principal device is more likely to retrieve valid data from the serial bus. However, sending multiple requests for each read reduces data throughput and increases latency.

Systems and methods of configuring a read synchronization delay at a subordinate device for 1 wire protocol are disclosed. As an example, a principal device is coupled via a serial bus to one or more subordinate devices. The principal device sends, via a data wire of the serial bus, a read command addressed to a subordinate device to initiate a read transaction. The data wire is put in a bus park subsequent to sending of the read command. In some examples, the principal device puts the data wire in a bus park subsequent to sending the read command. In some examples, the subordinate device puts the data wire in a bus park subsequent to receiving the read command.

If the subordinate device determines at the end of the bus park that the requested data is available to send, the subordinate device sends synchronization pulses on the data wire after the bus park and then sends the data to complete the read transaction. On the other hand, if the subordinate device determines that the requested data is not available to send at the end of the bus park, the subordinate device keeps the data wire in an extended bus park during an added delay for up to a delay threshold. The subordinate device, upon arrival of the data during the added delay, sends the synchronization pulses, and sends the data to complete the read transaction. Alternatively, the subordinate device, in response to determining that the added delay has reached the delay threshold prior to arrival of the data, sends termination pulses to terminate the read transaction. The added delay increases a likelihood that the requested data arrives at the subordinate device to send and increases a likelihood that the principal device retrieves valid data after the added delay. Selectively sending the synchronization pulses after an added delay has a lower impact on data throughput and latency compared to sending multiple requests for each read.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more subordinate devices ("subordinate device(s)" 122 of FIG. 1), which indicates that in some implementations the device 102 includes a single subordinate device 122 and in other implementations the device 102 includes multiple subordinate devices 122. For ease of reference herein, such features are generally introduced as "one or more" features and are subsequently referred to in the singular or optional plural (as indicated by "(s)") unless aspects related to multiple of the features are being described.

In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 1, multiple subordinate devices are illustrated and associated with reference numbers 122A and 122B. When referring to a particular one of these subordinate devices, such as a subordinate device 122A, the distinguishing letter "A" is used. However, when referring to any arbitrary one of these subordinate devices or to these subordinate devices as a group, the reference number 122 is used without a distinguishing letter.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system 100 operable to configure a read synchronization delay at a subordinate device for 1 wire protocol is disclosed. The system 100 includes a device 102 that includes a principal device 120 coupled via a serial bus 130 to one or more subordinate devices 122, such as a subordinate device 122A, a subordinate device 122B, one or more additional subordinate devices, or a combination thereof.

The principal device 120 includes a protocol controller 140 and a clock 144 (e.g., a local clock). A subordinate device 122 includes a protocol controller 142 and a clock 146 (e.g., a local clock). For example, the subordinate device 122A includes a protocol controller 142A and a local clock 146A. As another example, the subordinate device 122B includes a protocol controller 142B and a local clock 146B. The serial bus 130 includes a data wire 134. The serial bus 130 corresponds to a "one-wire" bus. For example, the serial bus 130 does not include a clock wire. The serial bus 130 may include a ground wire (not shown) in addition to the data wire 134.

In some implementations, the protocol controller 140 of the principal device 120 is integrated in an RF front-end device. In some aspects, the principal device 120 and the one or more subordinate devices 122 operate in compliance with a one-wire protocol. In a particular aspect, the principal device 120 and a subordinate device 122 correspond to a "master" device and a "slave" device, respectively, in compliance with the one-wire protocol. In a particular aspect, the principal device 120 (e.g., the protocol controller 140) is configured to initiate communication on the data wire 134. For example, the principal device 120 (e.g., the protocol controller 140) is configured to send one or more commands on the data wire 134 to the one or more subordinate devices 122. In a particular aspect, the subordinate device 122 (e.g., the protocol controller 142) is configured to perform one or more commands received on the data wire 134. As illustrative, non-limiting examples, a command can include a register read command to read data from a particular register, or a register write command to write data to a particular register.

In some implementations, components of the device 102 can switch roles between principal or subordinate device, with a single component coupled to the serial bus 130 corresponding to a principal device 120 at a given time. To illustrate, for a first transaction, a particular component coupled to the serial bus 130 corresponds to a principal device 120 and the remaining components coupled to the serial bus 130 correspond to subordinate devices 122. For a second transaction, another component coupled to the serial bus 130 can correspond to a principal device 120 and the remaining components coupled to the serial bus 130 can correspond to subordinate devices 122.

In some implementations, the principal device 120 includes a baseband processor of the device 102. In some implementations, the subordinate device(s) 122 include RFFE components, such as a power amplifier, a transmitter, a filter, a switch, a receiver, a low-noise amplifier, an antenna, a tuner, a processing circuit, a storage device, or a combination thereof. Although the principal device 120 and the subordinate device(s) 122 are illustrated as internal to the device 102, in other implementations the principal device 120, the subordinate device(s) 122, or a combination thereof, can be external to the device 102 and coupled to the serial bus 130.

During operation, the protocol controller 142 obtains data indicating a delay threshold 148 to be used by the protocol controller 142 during read transactions with the principal device 120. For example, the protocol controller 142A obtains data indicating a delay threshold 148A. As another example, the protocol controller 142B obtains data indicating a delay threshold 148B.

In a particular aspect, the delay threshold 148 is based on memory access latency, a configuration of the serial bus 130, or both, associated with a subordinate device 122. For example, the delay threshold 148A is based on a memory access latency associated with data reads performed by the protocol controller 142A of the subordinate device 122A. To illustrate, the memory access latency corresponds to an expected delay between the protocol controller 142A initiating a read at a register and obtaining data from the register at the subordinate device 122A.

As another example, the delay threshold 148A is based on a configuration of the data wire 134 between the principal device 120 and the subordinate device 122A. The configuration of the data wire 134 can include a line length 150 associated with the subordinate device 122A that corresponds to an expected delay between sending data from the subordinate device 122A and the data being received at the principal device 120. To illustrate, the line length 150 is based on a length 152 of a first wire between the principal device 120 and a connection point (CP) 162 of the data wire 134, a length 154 of the data wire 134 between the connection point 162 and a connection point 164 of the data wire 134, and a length 156 of a second wire between the connection point 164 and the subordinate device 122A. The data wire 134 between the connection point 162 and the connection point 164 corresponds to a portion of the shared bus (e.g., the serial bus 130). Similarly, in a particular aspect, the delay threshold 148B is based on at least one of memory access latency, a configuration of the serial bus 130, or both, associated with the subordinate device 122B.

In some aspects, the delay threshold 148A is distinct from the delay threshold 148B. In an example, the delay threshold 148A is less than the delay threshold 148B because at least one of the line length 150 or memory access latency of the subordinate device 122A is less than at least a corresponding one of a line length or memory access latency of the subordinate device 122B. To illustrate, a duration of the delay threshold 148B is longer than a duration of the delay threshold 148A.

In some aspects, the delay threshold 148A is the same as the delay threshold 148B. For example, the delay threshold 148A is the same as the delay threshold 148B because at least one of the line length 150 or memory access latency of the subordinate device 122A is equal to at least one of a line length or memory access latency, respectively, of the subordinate device 122B. In another example, the delay threshold 148A is the same as the delay threshold 148B because the delay threshold 148A and the delay threshold 148B are based on a representative (e.g., average) delay threshold. In a particular aspect, the data indicating one or more delay thresholds 148 is based at least in part on a configuration setting, default data, a user input, or a combination thereof. In a particular aspect, the data indicating one or more delay thresholds 148 is based at least in part on dynamically detected memory access latency, dynamically detected configuration of the serial bus 130, or both, associated with the subordinate device(s) 122.

The protocol controller 140 of the principal device 120 sends, on the data wire 134 of the serial bus 130, a read command addressed to a subordinate device 122A to initiate a read transaction, as further described with reference to FIG. 2A. For example, the read command identifies a register from which the subordinate device 122A is to read data to send on the data wire 134. In a particular aspect, the protocol controller 140 sends the read command in response to receiving a data request from another component of the device 102.

The data wire 134 is put into a bus park when data on the data wire 134 switches direction. In some implementations, the protocol controller 140 of the principal device 120 puts the data wire 134 into a bus park after sending the read command on the data wire 134. In alternative implementations, the protocol controller 142A of the subordinate device 122A puts the data wire 134 in a bus park responsive to receiving the read command addressed to the subordinate device 122A.

The protocol controller 142A of the subordinate device 122A, in response to receiving the read command on the data wire 134 addressed to the subordinate device 122A, initiates a read of the requested data from the register indicated in the read command, as further described with reference to FIG. 2A. The protocol controller 142A, in response to arrival of the data at the subordinate device 122A prior to an end of the bus park, sends one or more synchronization pulses on the data wire 134 and then sends the data on the data wire 134, as further described with reference to FIG. 2A. In this example, the synchronization pulses are sent subsequent to a delay window corresponding to a duration (e.g., one clock cycle) of the bus park. The protocol controller 140 of the principal device 120, in response to detecting the synchronization pulses on the data wire 134, reads the data on the data wire 134 and the read transaction is completed successfully.

Alternatively, the protocol controller 142A of the subordinate device 122A, in response to detecting an end of the bus park prior to arrival of the requested data at the subordinate device 122A, adds a delay that is based on the delay threshold 148A. For example, the delay threshold 148A indicates a particular count of clock cycles of the clock 146A. The protocol controller 142, in response to detecting arrival of the data at the subordinate device 122A prior to elapse of the particular count of clock cycles of the clock 146A, sends one or more synchronization pulses on the data wire 134 and then sends the data on the data wire 134, as further described with reference to FIG. 2B. In this example, the synchronization pulses are sent subsequent to a delay window corresponding to a duration (e.g., one clock cycle) of the bus park and the added delay. The protocol controller 140 of the principal device 120, after detecting the synchronization pulses on the data wire 134, reads the data on the data wire 134 and the read transaction is completed successfully. The clock cycles of the clock 146A that are added to the duration of the bus park prior to sending the one or more synchronization pulses on the data wire 134 correspond to a delay that is added by the subordinate device 122A to effectively extend the bus park, as further described with reference to FIG. 2B. A technical advantage of adding the delay includes enabling the protocol controller 140 of the principal device 120 to retrieve valid data from the data wire 134. A technical advantage of dynamically extending the delay window includes enabling the subordinate device 122A to limit the latency that is added due to the delay window.

In a particular aspect, the protocol controller 142A of the subordinate device 122A, in response to detecting that an added delay corresponding to the particular count of clock cycles indicated by the delay threshold 148A has elapsed prior to arrival of the data at the subordinate device 122A, sends one or more termination pulses on the data wire 134 to terminate the read transaction, as further described with reference to FIG. 2C. The protocol controller 140 of the principal device 120, based on detecting the termination pulses on the data wire 134, determines that the read transaction is unsuccessful and that the data wire 134 is available for sending any further commands to the one or more subordinate devices 122. A technical advantage of extending the delay window up to the duration indicated by the delay threshold 148A includes limiting a maximum latency that is added to the data wire 134 for a read transaction.

The system 100 thus enables the subordinate device 122A to have more time (when the bus park is effectively extended by an added delay) to retrieve the requested data. A technical advantage of using individual delay thresholds includes increasing a likelihood that a subordinate device 122 that has a higher delay threshold 148 (e.g., corresponding to higher memory latency or line length) has valid data at the end of a longer added delay.

Figure 2A:
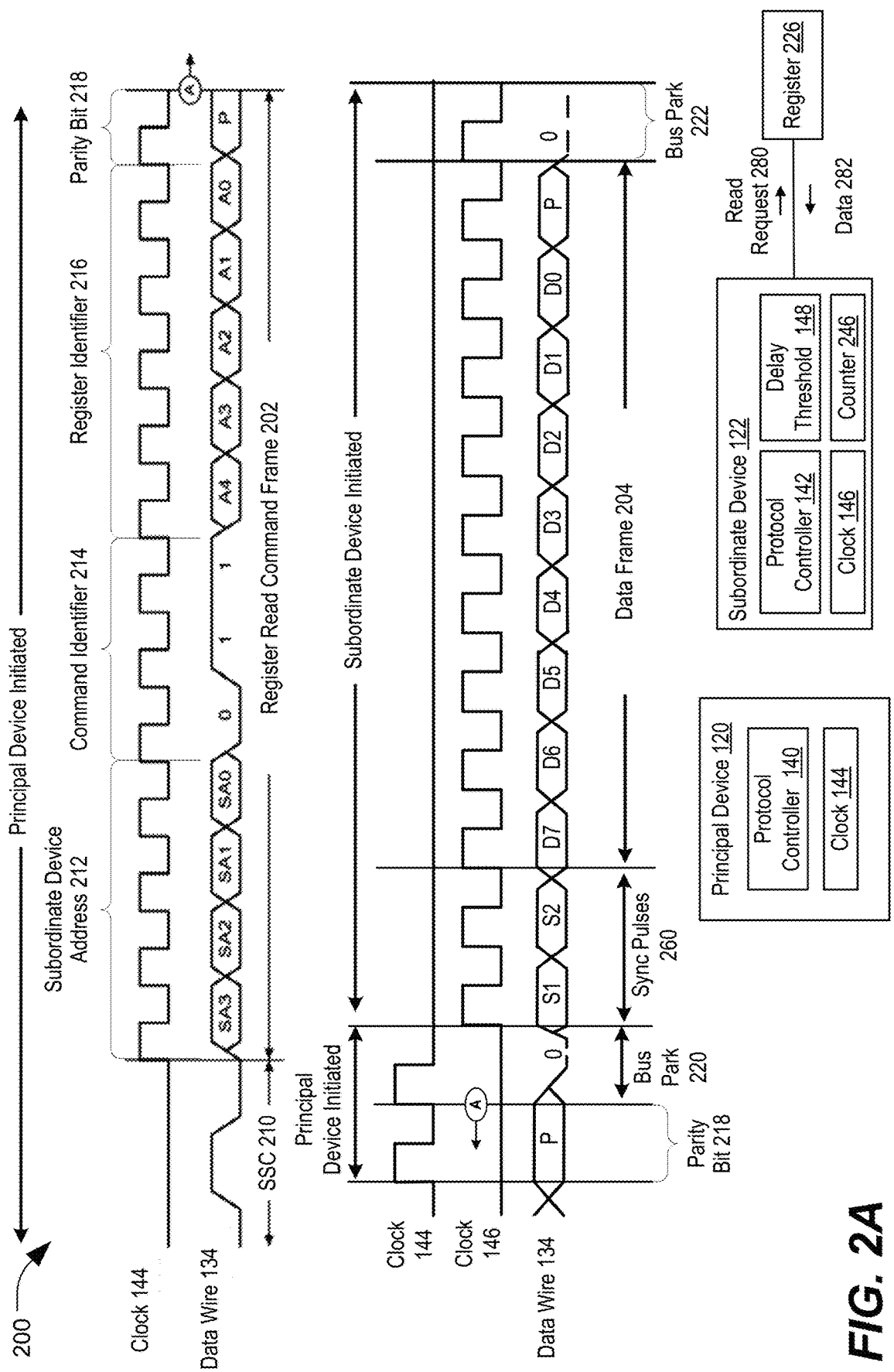
FIG. 2A is a diagram of an illustrative aspect of operations associated with a particular configuration of a read synchronization delay at a subordinate device for 1 wire protocol, in accordance with some examples of the present disclosure.

FIG. 2A is a diagram of an illustrative aspect of operations 200 associated with a particular configuration of a bus park delay, in accordance with some examples of the present disclosure.

The protocol controller 140 of the principal device 120 initiates a read transaction. For example, the protocol controller 140 sends a read command on the data wire 134 in accordance with clock cycles of the clock 144 (e.g., a local clock). To illustrate, the protocol controller 140 sends, on the data wire 134, a sequence start condition (SSC) 210 followed by a register read command frame 202. The register read command frame 202 indicates a subordinate device address 212 of a subordinate device 122 and a command identifier 214 (e.g., 011) of a register read command. The register read command frame 202 also includes a register identifier 216 of a register 226 from which the subordinate device 122 is to read data. The register read command frame 202 may also include a parity bit 218. The register 226 is coupled to the device 102 of FIG. 1. In some examples, the register 226 is integrated in the device 102. In other examples, the register 226 is external to the device 102.

The data wire 134 is placed in a bus park 220 subsequent to the register read command frame 202. In a particular example, the protocol controller 140 places the data wire 134 in the bus park 220 subsequent to sending the register read command frame 202. In an alternative example, the protocol controller 142 of the subordinate device 122, responsive to determining that the register read command frame 202 indicates the subordinate device address 212 of the subordinate device 122, places the data wire 134 in the bus park 220.

The protocol controller 142 of the subordinate device 122 receives, on the data wire 134 from the principal device 120, a read command addressed to the subordinate device 122 indicating initiation of the read transaction. For example, the protocol controller 142 receives the register read command frame 202 indicating the subordinate device address 212 of the subordinate device 122.

The protocol controller 142 of the subordinate device 122 initiates a memory access of the requested data responsive to receiving the read command. For example, the protocol controller 142, in response to receiving the register read command frame 202 indicating the subordinate device address 212 of the subordinate device 122, sends a read request 280 to the register 226 indicated by the register identifier 216.

In the example illustrated in FIG. 2A, the register 226, responsive to the read request 280, sends data 282 to the subordinate device 122. The protocol controller 142 of the subordinate device 122, in response to arrival of the data 282 prior to end of the bus park 220, sends synchronization pulses 260 on the data wire 134 based on clock cycles of the clock 146 (e.g., a local clock). The synchronization pulses 260 are sent responsive to detecting an end of a duration (e.g., one clock cycle of the clock 146) of the bus park 220. The synchronization pulses 260 including two pulses is provided as an illustrative example, in other examples the synchronization pulses 260 can include a single pulse or more than two pulses.

After sending the synchronization pulses 260, the protocol controller 142 sends a data frame 204 corresponding to the data 282 on the data wire 134 based on clock cycles of the clock 146 during the read transaction. The protocol controller 140, in response to detecting the synchronization pulses 260 on the data wire 134, retrieves the data frame 204 representing the data 282 from the data wire 134 subsequent to the synchronization pulses 260 to end the read transaction. The principal device 120 thus receives valid data from the data wire 134 without the subordinate device 122 adding a delay subsequent to the bus park 220.

In some aspects, the data frame 204 is followed by a bus park 222. For example, the protocol controller 142 places the data wire 134 in the bus park 222 subsequent to sending the data frame 204. In another example, the protocol controller 140 of the principal device 120 places the data wire 134 in the bus park 222 subsequent to receiving the data frame 204.

Figure 2B:
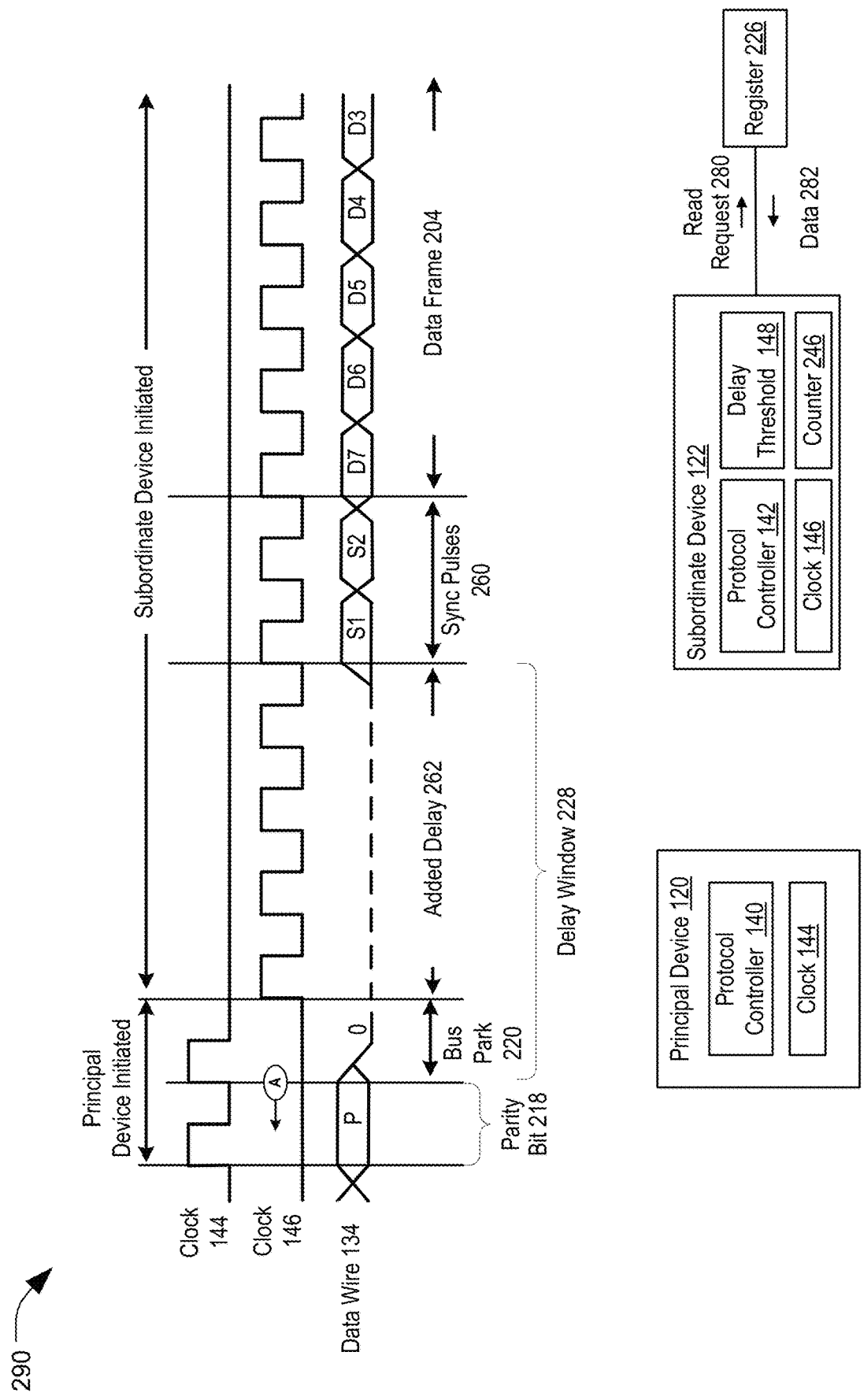
FIG. 2B is a diagram of an illustrative aspect of operations associated with another particular configuration of a read synchronization delay at a subordinate device for 1 wire protocol, in accordance with some examples of the present disclosure.

FIG. 2B is a diagram of an illustrative aspect of operations 290 associated with another particular configuration of a bus park delay, in accordance with some examples of the present disclosure.

Responsive to the subordinate device 122 receiving the register read command frame 202 on the data wire 134 from the principal device 120 and concurrently with sending the read request 280 to the register 226 indicated by the register identifier 216, as described with reference to FIG. 2A, the protocol controller 142 initializes a counter 246 based on the delay threshold 148 (e.g., a duration threshold of added delay) and updates the counter 246 at each clock cycle of the clock 146 (e.g., a local clock). In some implementations, the protocol controller 142 initializes the counter 246 responsive to determining that data has not been received at the subordinate device 122 from the register 226 prior to an end of the bus park 220. In these implementations, the protocol controller 142 uses the counter 246 to track a duration of an added delay 262 corresponding to a delay window 228.

The protocol controller 142, subsequent to detecting an end of the bus park 220, keeps the data wire 134 in a bus park during an added delay 262 while the counter 246 indicates that an end of the delay threshold 148 has not been reached. For example, the protocol controller 142, in response to determining that data has not been received from the register 226 prior to the end of the bus park 220, initializes the counter 246 to indicate a remaining count of clock cycles corresponding to the delay threshold 148, and updates (e.g., decreases) the counter 246 (e.g., by 1) at each clock cycle of the clock 146. The register 226, in response to the read request 280, provides data 282 to the subordinate device 122. The protocol controller 142, in response to detecting arrival of the data 282 at the subordinate device 122 and determining that the counter 246 indicates at least one remaining count of clock cycles, determines that the data 282 has arrived during the delay window 228. The protocol controller 142, in response to determining that the data 282 has arrived during the delay window 228, sends the synchronization pulses 260 on the data wire 134 based on clock cycles of the clock 146 (e.g., a local clock). Because the synchronization pulses 260 are sent upon detecting arrival of the data 282, a duration of the added delay 262 (and hence a duration of the delay window 228) is based on a memory access time associated with arrival of the data 282 at the subordinate device 122.

After sending the synchronization pulses 260, the protocol controller 142 sends a data frame 204 corresponding to the data 282 on the data wire 134 based on clock cycles of the clock 146 during the read transaction, as described with reference to FIG. 2A. The protocol controller 140, in response to detecting the synchronization pulses 260 on the data wire 134, retrieves the data frame 204 representing the data 282 from the data wire 134 subsequent to the synchronization pulses 260 to end the read transaction.

A duration of the delay window 228 (e.g., including the bus park 220 and the added delay 264) is longer than a duration of the bus park 220 (e.g., a clock cycle of the clock 146). The delay window 228 thus enables the principal device 120 to retrieve valid data from the data wire 134 that may be unavailable to send from the subordinate device 122 at the end of the bus park 220. A technical advantage of the added delay 262 can include increased throughput and reduced latency as compared to sending multiple requests for the same read.

Although the protocol controller 142 is described as initializing the counter 246 in response to detecting that data has not arrived at the subordinate device 122 prior to an end of the bus park 220, in other implementations the protocol controller 142 can initialize the counter 246 responsive to receiving the register read command frame 202 independently of detecting an end of the bus park 220. For example, the protocol controller 142 can use the counter 246 to track a duration of the bus park 220 and, if data is not received prior to the end of the bus park 220, also to track a duration of the added delay 262. To illustrate, the protocol controller 142 initializes the counter 246 based on a sum of a duration of the bus park 220 (e.g., 1 clock cycle) and the delay threshold 148 and sends the synchronization pulses 260 responsive to detecting arrival of the data 282 at the subordinate device 122 when the counter 246 indicates at least one remaining clock cycle.

Figure 2C:
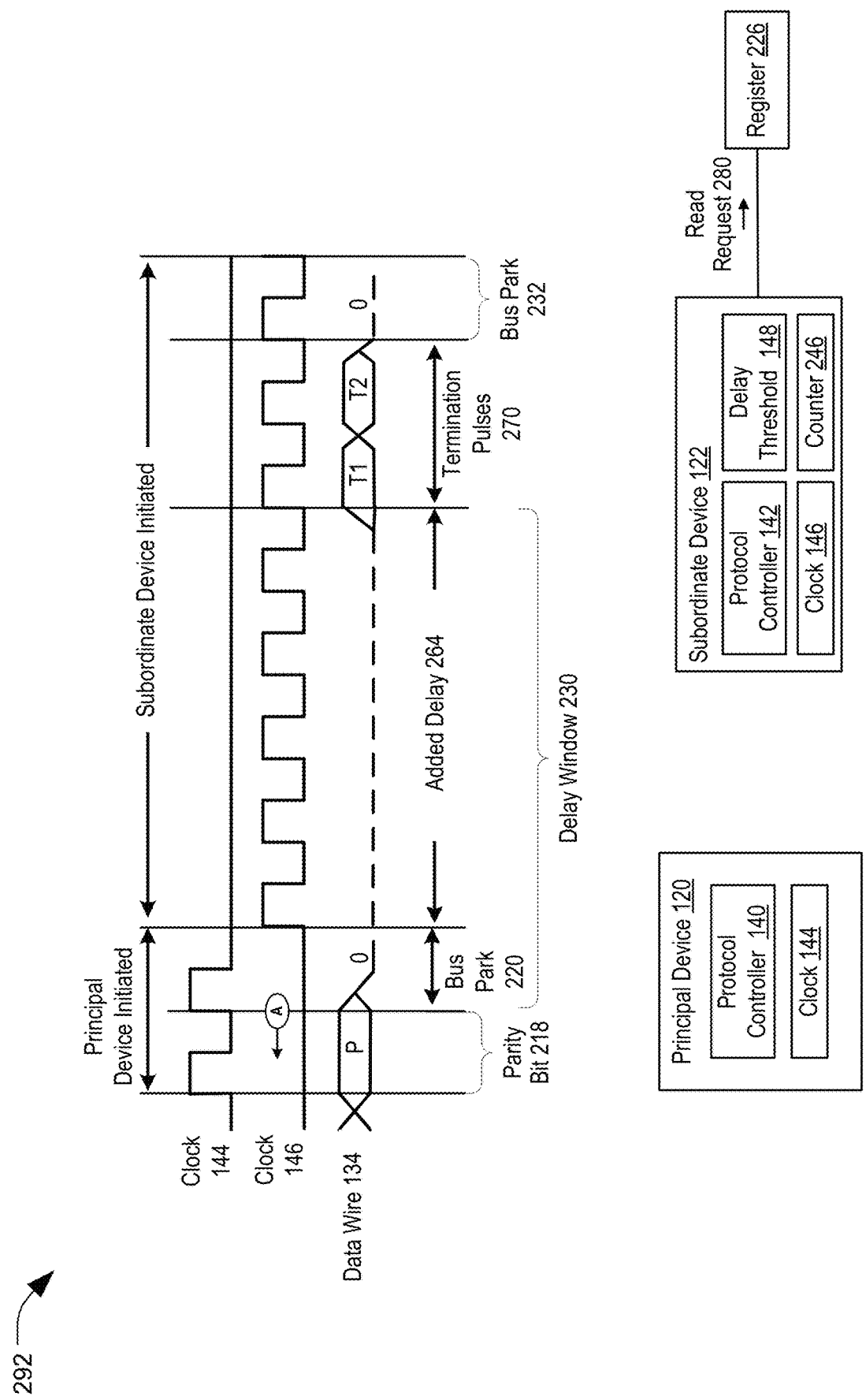
FIG. 2C is a diagram of an illustrative aspect of operations associated with another particular configuration of a read synchronization delay at a subordinate device for 1 wire protocol, in accordance with some examples of the present disclosure.

FIG. 2C is a diagram of an illustrative aspect of operations 292 associated with another particular configuration of a bus park delay, in accordance with some examples of the present disclosure.

Responsive to the subordinate device 122 receiving the register read command frame 202 on the data wire 134 from the principal device 120 and concurrently with sending the read request 280 to the register 226 indicated by the register identifier 216, the protocol controller 142 initializes a counter 246 based on the delay threshold 148 (e.g., a duration threshold of a delay window) and updates the counter 246 at each clock cycle of the clock 146 (e.g., a local clock), as described with reference to FIG. 2B.

The protocol controller 142, in response to detecting that the counter 246 has reached a value (e.g., 0) indicating no remaining clock cycles and that data from the register 226 has not arrived at the subordinate device 122, determines that a delay window 230 has ended prior to arrival of data from the register 226 and sends termination pulses 270 on the data wire 134 based on a clock cycle of a local clock (e.g., the clock 146). The delay window 230 includes the bus park 220 and an added delay 264 during which the data wire 134 effectively remains in bus park.

The protocol controller 142 sends the termination pulses 270 to terminate the read transaction. In a particular aspect, the protocol controller 142 places the data wire 134 in a bus park 232 subsequent to sending the termination pulses 270. The termination pulses 270 including two pulses is provided as an illustrative example, in other examples the termination pulses 270 can include a single pulse or more than two pulses. In a particular aspect, the protocol controller 140, in response to detecting a particular count of pulses (e.g., two pulses) between the bus park 220 and the bus park 232, determines that the read transaction is terminated unsuccessfully.

A technical advantage of sending the termination pulses 270 is to limit a latency associated with a data read. For example, the read transaction is terminated if the data has not arrived at the subordinate device 122 prior to an end of the delay window 230, and the data wire 134 is available for other commands.

The added delay 262 of FIG. 2B has a first duration from a first time corresponding to an end of the bus park 220 to a second time corresponding to the protocol controller 142 sending the synchronization pulses 260 responsive to receiving the data 282 prior to the counter 246 reaching the value (e.g., 0) indicating no remaining clock cycles. The added delay 264 has a second duration from the first time to a third time corresponding to the protocol controller 142 sending the termination pulses 270 responsive to determining that the delay window 230 has ended (e.g., the counter 246 has reached the value indicating no remaining clock cycles) prior to arrival of the data at the subordinate device 122. In a particular aspect, the second duration of the added delay 264 is longer than the first duration of the added delay 262, and so a duration of the delay window 230 is longer than a duration of the delay window 228.

Although the protocol controller 142 is described with reference to FIG. 2A as sending the synchronization pulses 260 in response to detecting the arrival of the data 282 at the subordinate device 122 prior to the counter 246 reaching a particular value (e.g., 0), in some other implementations the protocol controller 142 can send the synchronization pulses 260 in response to the counter 246 reaching the particular value (e.g., 0) and detecting that the data 282 has arrived at the subordinate device 122. In these implementations, the first duration of the added delay 262 can be equal to the second duration of the added delay 264, the duration of the delay window 228 can be equal to the duration of the delay window 230, and the duration of the added delays 262, 264 and the duration of the delay windows 228, 230 can be pre-determined based on the delay threshold 148.

Although the subordinate device 122 is described as using the counter 246 to track a duration of the added delay, in some other examples the principal device 120 can additionally, or in the alternative, track a duration of the added delay. For example, the protocol controller 140 initializes a counter concurrently with sending the register read command frame 202 based on a delay threshold 148 associated with the subordinate device 122. For example, the counter is initialized based on the delay threshold 148 and a pre-determined extra delay. The protocol controller 140 updates the counter at each clock cycle of the clock 144 (e.g., a local clock). The subordinate device 122, responsive to receiving the data 282 from the register 226, sends the synchronization pulses 260 followed by the data 282, as described with reference to FIG. 2A. The protocol controller 140, in response to detecting the synchronization pulses 260 prior to the counter reaching a value (e.g., 0) indicating no remaining clock cycles, reads the data 282 from the data wire 134 to complete the read transaction. Alternatively, the protocol controller 140, in response to determining that counter has reached a value (e.g., 0) indicating no remaining clock cycles prior to detecting synchronization pulses 260 on the data wire 134, terminates the read transaction.

Figure 3:
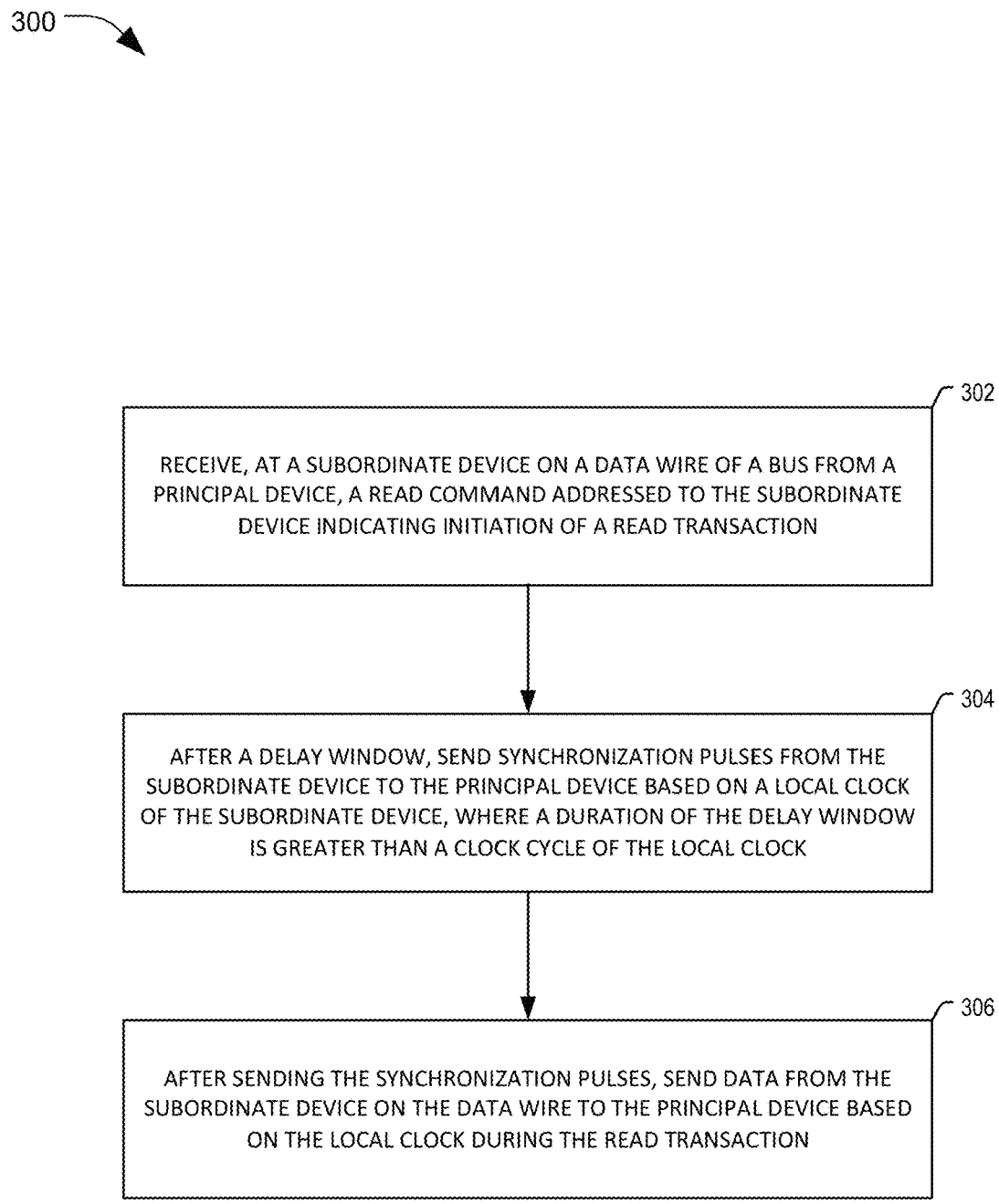
FIG. 3 is a diagram of a particular implementation of a method of configuration of a read synchronization delay at a subordinate device for 1 wire protocol that may be performed by the system of FIG. 1, in accordance with some examples of the present disclosure.

Referring to FIG. 3, a particular implementation of a method 300 of configuration of a read synchronization delay at a subordinate device for 1 wire protocol is shown. In a particular aspect, one or more operations of the method 300 are performed by at least one of the protocol controller 142, the subordinate device 122, the device 102, the system 100 of FIG. 1, or a combination thereof.

The method 300 includes, at block 302, receiving, at a subordinate device on a data wire of a bus from a principal device, a read command addressed to the subordinate device indicating initiation of a read transaction. For example, the protocol controller 142 receives, at a subordinate device 122 on a data wire 134 of a serial bus 130 from a principal device 120, a read command (e.g., the register read command frame 202 of FIG. 2A) addressed to the subordinate device 122 indicating initiation of a read transaction, as described with reference to FIG. 2A.

The method 300 also includes, at block 304, after a delay window, sending synchronization pulses from the subordinate device to the principal device based on a local clock of the subordinate device, where a duration of the delay window is greater than a clock cycle of the local clock. For example, the protocol controller 142 of the subordinate device 122, after the delay window 228, sends the synchronization pulses 260 from the subordinate device 122 to the principal device 120 based on the clock 146 (e.g., a local clock) of the subordinate device 122, as described with reference to FIG. 2B. A duration of the delay window 228 is greater than a clock cycle of the clock 146.

The method 300 further includes, at block 306, after sending the synchronization pulses, sending data from the subordinate device on the data wire to the principal device based on the local clock during the read transaction. For example, the protocol controller 142 of the subordinate device 122, after sending the synchronization pulses 260, sends the data frame 204 representing the data 282 on the data wire 134 to the principal device 120 based on the clock 146 during the read transaction, as described with reference to FIG. 2B.

The method 300 enables the subordinate device 122 to send data that arrives subsequent to the end of the bus park 220 and prior to the end of the delay window 228. The principal device 120 can thus retrieve valid data from the data wire 134 that has arrived at the subordinate device 122A prior to the end of the delay window 228.

The method 300 of FIG. 3 may be implemented by a field-programmable gate array (FPGA) device, an application-specific integrated circuit (ASIC), a processing unit such as a central processing unit (CPU), a digital signal processor (DSP), a controller, another hardware device, firmware device, or any combination thereof. As an example, the method 300 of FIG. 3 may be performed by a processor that executes instructions, such as described with reference to FIG. 4.

Figure 4:
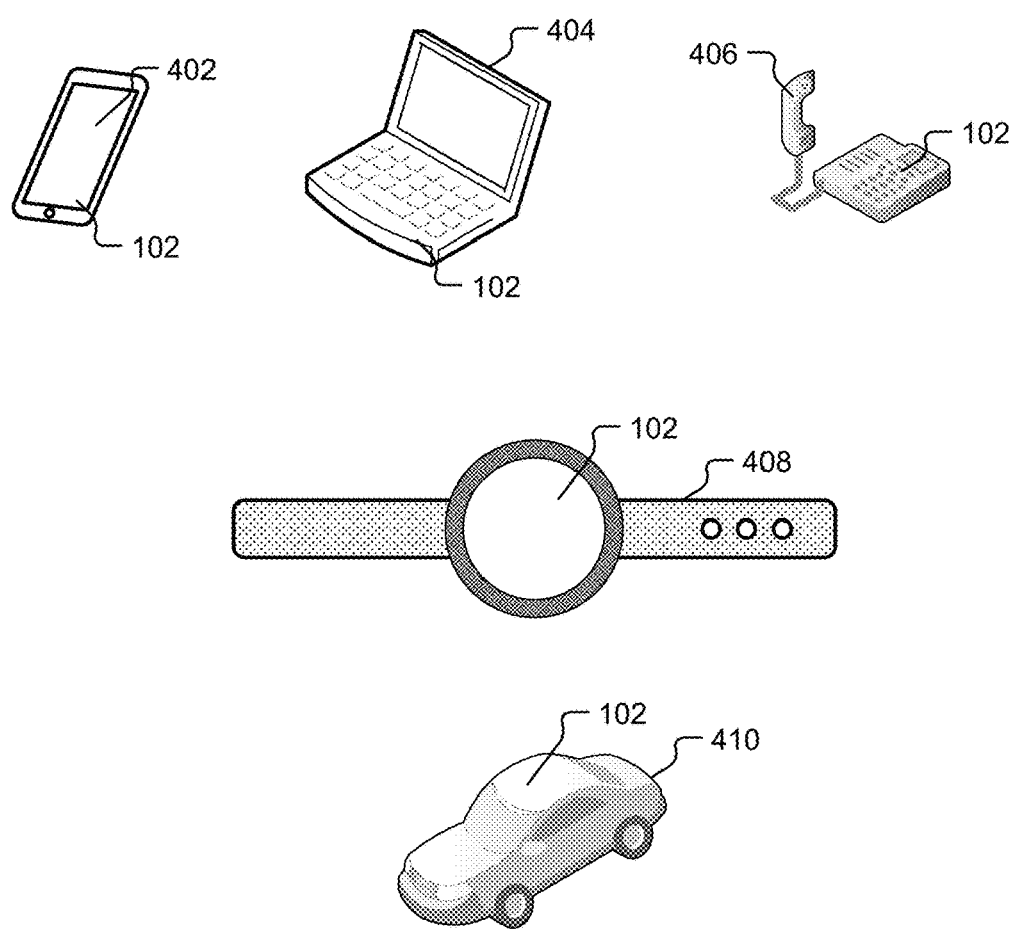
FIG. 4 illustrates various electronic devices that may integrate an electronic circuit, and/or an integrated device, described herein.

FIG. 4 illustrates various electronic devices that may include or be integrated with the device 102. For example, a mobile phone device 402, a laptop computer device 404, a fixed location terminal device 406, a wearable device 408, or a vehicle 410 (e.g., an automobile or an aerial device) may include a device 102 described herein. The devices 402, 404, 406 and 408 and the vehicle 410 illustrated in FIG. 4 are merely exemplary. Other electronic devices may also feature the device 102 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices (e.g., watches, glasses), Internet of things (IoT) devices, servers, routers, electronic devices implemented in vehicles (e.g., autonomous vehicles), or any other device that stores or retrieves data or computer instructions, or any combination thereof.

One or more of the components, processes, features, and/or functions illustrated in FIGS. 1-4 may be rearranged and/or combined into a single component, process, feature or function or embodied in several components, processes, or functions. Additional elements, components, processes, and/or functions may also be added without departing from the disclosure.

In conjunction with the described implementations, an apparatus includes means for receiving, at a subordinate device on a data wire of a bus from a principal device, a read command addressed to the subordinate device indicating initiation of a read transaction. For example, the means for receiving can correspond to the protocol controller 142, the subordinate device 122, the data wire 134, the device 102, the system 100, one or more other circuits or components configured to receive, at a subordinate device on a data wire of a bus from a principal device, a read command addressed to the subordinate device indicating initiation of a read transaction, or any combination thereof.

The apparatus also includes means for sending, after a delay window, synchronization pulses from the subordinate device to the principal device based on a local clock of the subordinate device, where a duration of the delay window is greater than a clock cycle of the local clock. For example, the means for sending the synchronization pulses can correspond to the protocol controller 142, the subordinate device 122, the data wire 134, the device 102, the system 100, one or more other circuits or components configured to send synchronization pulses after the delay window, or any combination thereof.

The apparatus further includes means for sending data, after sending the synchronization pulses, from the subordinate device on the data wire to the principal device based on the local clock during the read transaction. For example, the means for sending the data can correspond to the protocol controller 142, the subordinate device 122, the data wire 134, the device 102, the system 100, one or more other circuits or components configured to send data after sending the synchronization pulses, or any combination thereof.

In some implementations, a non-transitory computer-readable medium (e.g., a computer-readable storage device, such as a memory) includes instructions that, when executed by one or more processors (e.g., the protocol controller 142), cause the one or more processors to receive, at a subordinate device (e.g., a subordinate device 122) on a data wire (e.g., the data wire 134) of a bus (e.g., the serial bus 130) from a principal device (e.g., the principal device 120), a read command (e.g., the register read command frame 202) addressed to the subordinate device indicating initiation of a read transaction. The instructions also cause the one or more processors to, after a delay window (e.g., the delay window 228), send synchronization pulses (e.g., the synchronization pulses 260) from the subordinate device to the principal device based on a local clock (e.g., the clock 146) of the subordinate device, a duration of the delay window is greater than a clock cycle of the local clock. The instructions further cause the one or more processors to, after sending the synchronization pulses, send data (e.g., the data frame 204 representing the data 282) from the subordinate device on the data wire to the principal device based on the local clock during the read transaction.

Particular aspects of the disclosure are described below in sets of interrelated Examples:

According to Example 1, a subordinate device includes a local clock; and a protocol controller coupled to a bus that includes a data wire, the protocol controller configured to: receive, on the data wire from a principal device, a read command addressed to the subordinate device indicating initiation of a read transaction; after a delay window, send synchronization pulses to the principal device based on the local clock, wherein a duration of the delay window is greater than a clock cycle of the local clock; and after sending the synchronization pulses, send data on the data wire to the principal device based on the local clock during the read transaction.

Example 2 includes the subordinate device of Example 1, wherein the duration of the delay window is based on memory access latency, a configuration of the bus, or both.

Example 3 includes the subordinate device of Example 1 or Example 2, wherein the protocol controller is configured to, responsive to receiving the read command: initialize a counter based on the duration of the delay window; update the counter at each clock cycle of the local clock; and send the synchronization pulses in response to the counter reaching a particular value.

Example 4 includes the subordinate device of any of Examples 1 to 3, wherein the duration of the delay window is pre-determined.

Example 5 includes the subordinate device of any of Examples 1 to 4, wherein the duration of the delay window is based on a memory access time associated with arrival of the data.

Example 6 includes the subordinate device of any of Examples 1 to 5, wherein the protocol controller is configured to initiate a memory access of the data responsive to receiving the read command; and send the synchronization pulses in response to arrival of the data.

Example 7 includes the subordinate device of any of Examples 1 to 6, wherein the protocol controller is configured to, responsive to receiving the read command, initialize a counter and initiate a memory access of the data; and update the counter at each clock cycle of the local clock.

Example 8 includes the subordinate device of Example 7, wherein the protocol controller is configured to send termination pulses to the principal device in response to the counter reaching a particular value prior to arrival of the data, the termination pulses corresponding to a termination of the read transaction.

Example 9 includes the subordinate device of Example 7 or Example 8, wherein the protocol controller is configured to send the synchronization pulses to the principal device in response to arrival of the data prior to the counter reaching a particular value.

According to Example 10, a method includes receiving, at a subordinate device on a data wire of a bus from a principal device, a read command addressed to the subordinate device indicating initiation of a read transaction; after a delay window, sending synchronization pulses from the subordinate device to the principal device based on a local clock of the subordinate device, wherein a duration of the delay window is greater than a clock cycle of the local clock; and after sending the synchronization pulses, sending data from the subordinate device on the data wire to the principal device based on the local clock during the read transaction.

Example 11 includes the method of Example 10, wherein the duration of the delay window is based on memory access latency, a configuration of the bus, or both.

Example 12 includes the method of Example 10 or Example 11, and further includes, responsive to receiving the read command: initializing a counter based on the duration of the delay window; and updating the counter at each clock cycle of the local clock, wherein the synchronization pulses are sent in response to the counter reaching a particular value.

Example 13 includes the method of any of Examples 10 to 12, wherein the duration of the delay window is pre-determined.

Example 14 includes the method of any of Examples 10 to 13, wherein the duration of the delay window is based on a memory access time associated with arrival of the data.

Example 15 includes the method of any of Examples 10 to 14, and further includes initiating a memory access of the data responsive to receiving the read command, wherein the synchronization pulses are sent in response to arrival of the data.

Example 16 includes the method of any of Examples 10 to 15, and further includes responsive to receiving the read command, initializing a counter and initiating a memory access of the data; and updating the counter at each clock cycle of the local clock.

Example 17 includes the method of Example 16, wherein the synchronization pulses are sent to the principal device in response to arrival of the data prior to the counter reaching a particular value.

According to Example 18, a non-transitory computer-readable medium stores instructions that, when executed by one or more processors, cause the one or more processors to receive, at a subordinate device on a data wire of a bus from a principal device, a read command addressed to the subordinate device indicating initiation of a read transaction; after a delay window, send synchronization pulses from the subordinate device to the principal device based on a local clock of the subordinate device, wherein a duration of the delay window is greater than a clock cycle of the local clock; and after sending the synchronization pulses, send data from the subordinate device on the data wire to the principal device based on the local clock during the read transaction.

Example 19 includes the non-transitory computer-readable medium of Example 18, wherein the duration of the delay window is based on memory access latency, a configuration of the bus, or both.

Example 20 includes the non-transitory computer-readable medium of Example 18 or Example 19, wherein the instructions, when executed by the one or more processors, cause the one or more processors to, responsive to receiving the read command: initialize a counter based on the duration of the delay window; update the counter at each clock cycle of the local clock; and send the synchronization pulses in response to the counter reaching a particular value.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A subordinate device comprising:
    a local clock; and
    a protocol controller coupled to a bus that includes a data wire, the protocol controller configured to:
        receive, on the data wire from a principal device, a read command addressed to the subordinate device indicating initiation of a read transaction;
        after a delay window, send synchronization pulses to the principal device based on the local clock, wherein a duration of the delay window is greater than a clock cycle of the local clock; and
        after sending the synchronization pulses, send data on the data wire to the principal device based on the local clock during the read transaction.

2. The subordinate device of claim 1, wherein the duration of the delay window is based on memory access latency, a configuration of the bus, or both.

3. The subordinate device of claim 1, wherein the protocol controller is configured to, responsive to receiving the read command:
    initialize a counter based on the duration of the delay window;
    update the counter at each clock cycle of the local clock; and
    send the synchronization pulses in response to the counter reaching a particular value.

4. The subordinate device of claim 1, wherein the duration of the delay window is pre-determined.

5. The subordinate device of claim 1, wherein the duration of the delay window is based on a memory access time associated with arrival of the data.

6. The subordinate device of claim 1, wherein the protocol controller is configured to:
    initiate a memory access of the data responsive to receiving the read command; and
    send the synchronization pulses in response to arrival of the data.

7. The subordinate device of claim 1, wherein the protocol controller is configured to:
    responsive to receiving the read command, initialize a counter and initiate a memory access of the data; and
    update the counter at each clock cycle of the local clock.

8. The subordinate device of claim 7, wherein the protocol controller is configured to send termination pulses to the principal device in response to the counter reaching a particular value prior to arrival of the data, the termination pulses corresponding to a termination of the read transaction.

9. The subordinate device of claim 7, wherein the protocol controller is configured to send the synchronization pulses to the principal device in response to arrival of the data prior to the counter reaching a particular value.

10. A method comprising:
    receiving, at a subordinate device on a data wire of a bus from a principal device, a read command addressed to the subordinate device indicating initiation of a read transaction;
    after a delay window, sending synchronization pulses from the subordinate device to the principal device based on a local clock of the subordinate device, wherein a duration of the delay window is greater than a clock cycle of the local clock; and
    after sending the synchronization pulses, sending data from the subordinate device on the data wire to the principal device based on the local clock during the read transaction.

11. The method of claim 10, wherein the duration of the delay window is based on memory access latency, a configuration of the bus, or both.

12. The method of claim 10, further comprising, responsive to receiving the read command:
    initializing a counter based on the duration of the delay window; and
    updating the counter at each clock cycle of the local clock, wherein the synchronization pulses are sent in response to the counter reaching a particular value.

13. The method of claim 10, wherein the duration of the delay window is pre-determined.

14. The method of claim 10, wherein the duration of the delay window is based on a memory access time associated with arrival of the data.

15. The method of claim 10, further comprising initiating a memory access of the data responsive to receiving the read command, wherein the synchronization pulses are sent in response to arrival of the data.

16. The method of claim 10, further comprising:
    responsive to receiving the read command, initializing a counter and initiating a memory access of the data; and
    updating the counter at each clock cycle of the local clock.

17. The method of claim 16, wherein the synchronization pulses are sent to the principal device in response to arrival of the data prior to the counter reaching a particular value.

18. A non-transitory computer-readable medium storing instructions that, when executed by one or more processors, cause the one or more processors to:
    receive, at a subordinate device on a data wire of a bus from a principal device, a read command addressed to the subordinate device indicating initiation of a read transaction;
    after a delay window, send synchronization pulses from the subordinate device to the principal device based on a local clock of the subordinate device, wherein a duration of the delay window is greater than a clock cycle of the local clock; and
    after sending the synchronization pulses, send data from the subordinate device on the data wire to the principal device based on the local clock during the read transaction.

19. The non-transitory computer-readable medium of claim 18, wherein the duration of the delay window is based on memory access latency, a configuration of the bus, or both.

20. The non-transitory computer-readable medium of claim 18, wherein the instructions, when executed by the one or more processors, cause the one or more processors to, responsive to receiving the read command:
    initialize a counter based on the duration of the delay window;
    update the counter at each clock cycle of the local clock; and
    send the synchronization pulses in response to the counter reaching a particular value.

* * * * *